United States Patent

[11] 3,593,496

| [72] | Inventor | Edward W. Merrill |
| | | Cambridge, Mass. |
| [21] | Appl. No. | 856,765 |
| [22] | Filed | Sept. 10, 1969 |
| [45] | Patented | July 20, 1971 |
| [73] | Assignee | Charles River Foundation |
| | | Boston, Mass. |

[54] METHOD FOR PURIFYING GASES
7 Claims, 1 Drawing Fig.

| [52] | U.S. Cl. | 55/77 |
| [51] | Int. Cl. | B01d 53/06 |
| [50] | Field of Search | 23/2, 4; |
| | | 55/6—8, 77, 79, 107; 260/403 |

[56] References Cited
UNITED STATES PATENTS

| 2,720,939 | 10/1955 | Stokes | 55/7 |
| 2,935,375 | 5/1960 | Boucher | 55/107 X |
| 3,503,704 | 3/1970 | Marks | 55/8 X |
| 3,520,662 | 7/1970 | Marks | 55/107 X |

Primary Examiner—Samih N. Zaharna
Assistant Examiner—R. W. Burks
Attorney—Kenway, Jenney & Hildreth ABSTRACT: Organic pollutants, such as hydrocarbons, can be removed from air by mixing the air with an aerosol of particles of water containing a surfactant which presents an oleophilic surface on the particles. The air is preferably humidified to 100 percent RH prior to mixing it with the aerosol, so that evaporation of the aerosol particles will not occur. The aerosol particles are effective by absorbing organic pollutants into their oleophilic surfaces, and removal of the particles by filtration or electrostatic precipitation leaves the air substantially purified of such pollutants.

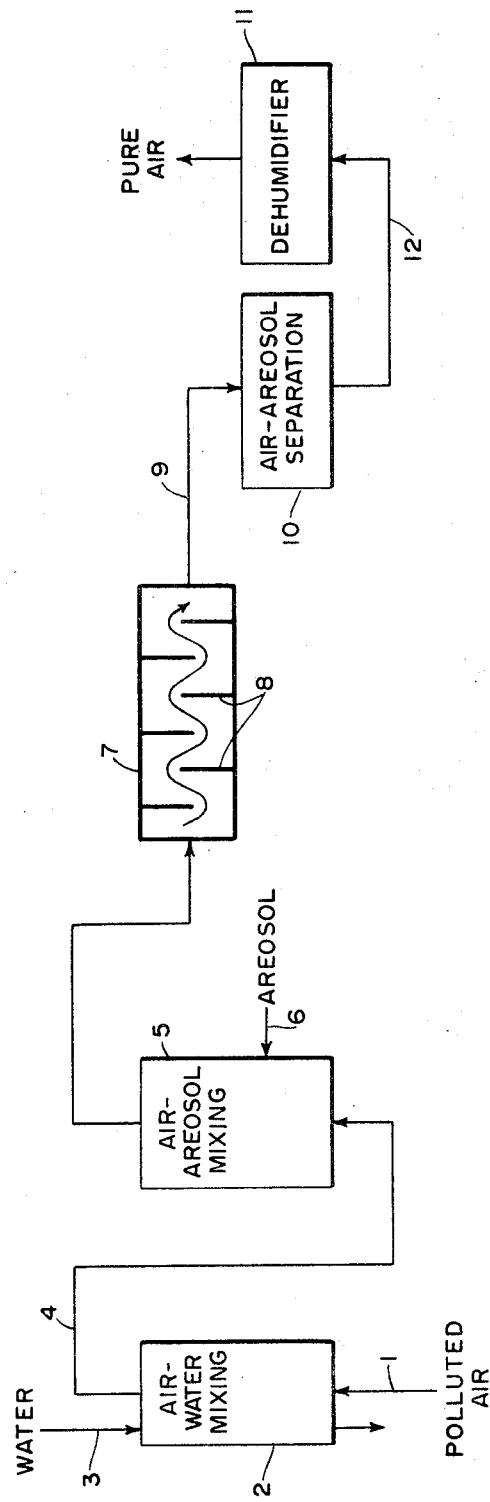

METHOD FOR PURIFYING GASES

BACKGROUND OF THE INVENTION

This invention relates to air purification, and consists in method and apparatus for removing organic pollutants from air.

The types of pollutants in air vary widely in chemical composition, physical structure and particle size, ranging from small toxic molecules, such as sulfur dioxide to gross colloidal particles such as pollen, silica and soot. At present filtration can be employed to remove about 99.9 percent of all colloidal particles having diameter greater than 3,000A. The filtered air however may still contain a wide variety of molecular pollutants of molecular weights ranging from less than 100 to more than a 1,000, including carbon monoxide, the oxides of sulfur and nitrogen and others which are relatively soluble in water, and these may be removed by scrubbing with water.

Organic molecular pollutants in air are now common in urban areas, and certain of these may have harmful effects to humans after long time exposure. These include hydrocarbons, especially aromatic hydrocarbons formed from the partial incomplete combustion of fuel, and are introduced through motor vehicle exhausts, smoke stacks associated with fuel oil burning installations, and jet aircraft emissions. Generally speaking these hydrocarbonlike materials can be removed effectively only by scrubbing with chemically similar liquids, such as mineral oils. However, the use of such scrubbing liquids leaves the air saturated with its vapors, and as they have a low but finite vapor pressure the air thus scrubbed is likely to have the odor of the scrubbing material.

Scrubbing systems moreover are not well adapted to handle extremely large quantities of air.

SUMMARY OF THE INVENTION

This invention provides a vastly improved system for purifying air of organic pollutants without introducing counter pollutants, and which is adapted for the handling of large quantities of air without requiring excessively large equipment installations.

Applicant's copending application Ser. No. 823,972 filed May 12, 1969 discloses that an aqueous aerosol can be prepared by nebulizing an aqueous lecithin dispersion. Such an aerosol presents extremely fine droplets of between about 0.2 to 2 micron diameter the surfaces of which are oleophilic because of the surfactant properties of lecithin, whose molecules are partly hydrophilic and partly oleophilic, the latter being for example, palmitic groups which constitute the surface of the droplets.

The present invention centers on the fact that such an aerosol of such small particle size presents a surface-to-volume ratio of the order of 60,000 cm.$^2$/cm.$^3$ and that the surfaces of these particles are adsorptive of organic molecular pollutants. In carrying out this invention, air to be purified is first humidified, and is then mixed with a quantity of an aerosol of this type sufficient to provide the adsorptive area and volume sufficient to remove the organic pollutants present in the air in a period of time of about a minute. The mixture of air and aerosol are maintained the the time necessary, and the aerosol particles are then removed by means of filtration or electrostatic precipitation.

DETAILED DESCRIPTION

The process and apparatus of this invention are shown in the attached drawing, which is a schematic flow sheet.

As shown in the drawing, air to be purified is introduced through a suitable conduit 1 into a humidifying tower 2, in which is maintained a supply of water introduced through a pipe 3. The humidifier may be any of a number of conventional liquid gas countercurrent contact apparatus, such as a packed column. The air leaving the humidifier 2 is conveyed through a conduit 4 to an aerosol-mixing chamber 5, into which the aerosol is also introduced through a conduit 6. The mixing chamber 5 may be simply an open tank, or it may contain baffles of deflectors to assist in mixing. Alternatively, the mixing chamber may be part of nebulizing apparatus in which the aerosol is generated in the presence of the air to be purified. The aerosol may be formed in any of several conventional ways. One preferred apparatus is the Ultramist nebulizer which is marketed by Macrosonics Corporation, 88 Elston Street, Rahway, N. J. 07065. This will form a suitable aerosol from a 2 wt. percent aqueous dispersion of DL dipalmitoyl-α-lecithin, at 25° C. or more when operated at 800,000 Hertz at 15 watts energy. The larger nebulizer marketed by the same company bearing the identification Multisons 180 VF will aerosolize up to 12.5cc./minute at variable frequencies between 0.1 and 1 MegaHertz including 800,000 Hertz. A more detailed description is given in the above identified copending application. After mixing the air and aerosol, the mixture is fed into a dwell chamber 7, which is preferably provided with staggered baffles 8, which serve to lengthen the flow path and prevent the formation of stagnant pockets. The dwell chamber 7 is designed to provide a dwell time of about 1 minute, during which adsorption of organic pollutants will occur. The air-aerosol mixture is then conveyed from the dwell chamber 7 by a conduit 9 into a separation device 10, which may be a conventional filter such as a multilayered fibrous filter used in the "laminar flow" clean air benches manufactured by the Farr Co., or it may be an electrostatic precipitator of conventional type, such as a Cottrell Precipitron. The purified air is conveyed from the separator 10 by conduit 12 and will ordinarily be processed in a dehumidifier 11, typically a refrigeration unit which will cause the moisture to be condensed out. The moisture removed in the humidifier may, if desired, be recycled back to the humidifier and introduced through the pipe 3. In like manner the aerosol particles separated in the separator 10 may be reprocessed to recover the surfactant and recycled back to the air aerosol mixing chamber 5.

Calculations indicate that an aerosol prepared from one gram of dipalmitoyla-lecithin suspended in 50 cc. of water presents a surface area of about 3 million sq. cm., an extension that approaches that of a monomolecular film.

When an aerosol of this nature is present in air to be purified, the outer surface layer of the particles, which is the palmitic chain of the lecithin, act as scavengers for hydrocarbon molecules in the contaminated air, as a consequence of molecular collision of the hydrocarbon molecules with the surface of the aerosolized particles and by adsorption thereon. The aerosolized particles, because of their aqueous centers will also remove water-soluble molecular pollutants such as the oxides of nitrogen, and sulfur, and ammonia, which will diffuse through the palmitic chain surface layer and become dissolved in the water. The aerosol particles will also associate with colloidal particles and other particulate contaminants upon collision, and these particles are thereby rendered more easily removed by the subsequent separation.

The quantity of aerosol to be used till depend on a number of factors, particularly the quantity of contaminants to be removed, the volume of air to be treated, and the dwell time to be employed. As removal depends upon the collision of organic molecules with the surface of the aerosol particles, substantially complete removal depends upon a density of particles and a dwell time adequate to insure that all of the organic molecules have adequately contacted an aerosol surface. Substantial removal will occur if the density of the aerosol particles is such that their mean center-to-center distance is of the order of 10 to 100 times the mean free path of the pollutant molecules.

The removal of 3,4-benzpyrene from air may be accomplished by mixing with each cubic meter of air to be treated, aerosolized particles formed from 1 gram of an aqueous dispersion containing 2 percent by weight of DL dipalmitoyl-α-lecithin. After 1 second of contact the benzpyrene content will be reduced to about one-twentieth of its original concentration, and after 1 minute of contact substantially all of the benzpyrene will have been removed.

The aerosolized aqueous particles useful in this invention are preferably those formed from aqueous suspensions of DL dipalmitoyl-$\alpha$-lecithin as the surfactant, because of the extremely small particle size that may be produced, and because of the relatively great stability of these particles in respect to resistance to evaporation. Other surfactants which present an oleophilic surface should be useful but less effective if they do not permit the formation of such small particles, or of such long-lasting particles. Their use accordingly would require greater amounts of aerosol for a given quantity of air, but the ability to adsorb organic molecular impurities in the air may still be utilized. As pointed out in applicant's copending application, other types of lecithin may also be useful, particularly those which contain, per molecule, two residues from other aliphatic acids such as stearic or oleic, those being adjacent on the beta and gamma carbons of the glycerine unit with the phosphatidylcholine group on the alpha carbon, the acyl residues being of either D, L, or DL racemic configuration.

This invention has been described with specific reference to its preferred embodiment and it is contemplated that modifications will readily occur to those skilled in the art and familiar with the principles herein set forth, and that such may be made without departing from the scope of this invention. Apparatus other than that described may obviously be employed, as the individual items are generally conventional and merchandised on the basis of their various functions. Both the humidification and dehumidification steps may be eliminated if desired. Elimination of the humidification step will of course result in evaporation of the aqueous aerosol particles until the air is saturated, and may require excessive amounts of the aerosol for effective removal of organic pollutants. Lecithin surfaces will nevertheless be presented to the air effectively to absorb organic materials. Elimination of the dehumidification step simply means delivery of water vapor saturated air for whatever end use the air is to be used. High humidity may for instance be desirable in certain thereupeutic environments. Inorganic gases other than air may also be purified in accordance with this invention such as gases stored under pressure for use in breathing equipment or gases used in various manufacturing procedures where gas purity is essential.

Having thus disclosed this invention and described in detail a preferred embodiment thereof I claim and desire to secure by Letters Patent:

1. A process for removing organic pollutants from an inorganic gas which comprises mixing the gas with an aerosol of particles having an aqueous core and an oleophilic surface for a period to effect adsorption of said pollutants on said aerosol and separating said gas from said aerosol.

2. The process of claim 1 wherein the oleophilic surface comprises a lecithin.

3. The process of claim 2 wherein the lecithin is DL dipalmitoyl-$\alpha$-lecithin.

4. The process of claim 1 wherein the gas is air.

5. The process of claim 2 wherein the gas is air.

6. The process of claim 1 wherein the concentration of said aerosol is such that the mean center-to-center distance between aerosol particles is between 10 and 100 times the mean free path of the pollutant molecules.

7. The process of claim 1 wherein the relative humidity of the inorganic gas contacted with the aerosol is substantially 100 percent.